(12) United States Patent
Nobuta et al.

(10) Patent No.: US 9,415,961 B2
(45) Date of Patent: Aug. 16, 2016

(54) PAPER TRANSPORT DEVICE (71) Applicant: SEIKO EPSON CORPORATION, Tokyo (JP)

(72) Inventors: Kosaku Nobuta, Nagano (JP); Yasuo Sunaga, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/831,262

(22) Filed: Aug. 20, 2015

(65) Prior Publication Data

US 2016/0060057 A1 Mar. 3, 2016

(30) Foreign Application Priority Data

Aug. 28, 2014 (JP) .................................. 2014-173949

(51) Int. Cl.
| | |
|---|---|
| *B65H 7/06* | (2006.01) |
| *B65H 7/12* | (2006.01) |
| *B65H 7/20* | (2006.01) |
| *B65H 5/06* | (2006.01) |
| *B65H 29/58* | (2006.01) |
| *H02P 29/02* | (2016.01) |

(52) U.S. Cl.
CPC .................. *B65H 7/12* (2013.01); *B65H 5/062* (2013.01); *B65H 5/068* (2013.01); *B65H 7/20* (2013.01); *B65H 29/58* (2013.01); *H02P 29/022* (2013.01); *B65H 2511/52* (2013.01); *B65H 2511/528* (2013.01); *B65H 2515/704* (2013.01)

(58) Field of Classification Search
CPC ...... B65H 7/12; B65H 7/20; B65H 2515/704; B65H 2511/52; B65H 2511/528
See application file for complete search history.

(56) References Cited

U.S. PATENT DOCUMENTS

| | | | | | |
|---|---|---|---|---|---|
| 5,796,221 | A | * | 8/1998 | Cramer .................. | B65G 43/02 318/46 |
| 6,112,156 | A | * | 8/2000 | Kang .................... | G01R 31/343 702/58 |
| 6,407,523 | B1 | * | 6/2002 | Allan ..................... | B65G 43/02 198/323 |
| 7,978,990 | B2 | * | 7/2011 | Tajima ............... | G03G 15/0258 399/100 |
| 2003/0235450 | A1 | * | 12/2003 | Okamoto ................. | B65H 7/20 399/407 |
| 2013/0308151 | A1 | * | 11/2013 | Kobayashi ........... | G08B 21/182 358/1.13 |

FOREIGN PATENT DOCUMENTS

JP            06-164784 A        6/1994

* cited by examiner

*Primary Examiner* — Luis A Gonzalez
(74) *Attorney, Agent, or Firm* — Global IP Counselors, LLP (57) ABSTRACT

A paper transport device includes a motor; a transport portion that transports a paper by using a power generated by the motor; a determination portion that, when the paper is transported in a transport direction, determines whether or not a load larger than or equal to a predetermined load has been applied to the motor for a predetermined period; and a motor control portion. When the determination portion determines that a load larger than or equal to the predetermined load has been applied to the motor for the predetermined period, the motor control portion rotates the motor in a direction reverse to a normal rotation direction and then rotates the motor again in the normal rotation direction by inputting to the motor an electric current being larger than an electric current that has been input to the motor for transporting the paper in the transport direction, before an electric current causing a load that is larger than or equal to the predetermined load is input to the motor.

6 Claims, 6 Drawing Sheets

PAPER TRANSPORT DEVICE

BACKGROUND

1. Technical Field

The present invention relates to a paper transport device.

2. Related Art

In products, such as a scanner and a copier, which include a mechanism for transporting a document (paper), a situation in which a so-called paper jam occurs during a paper transport and this paper jam brings the paper transport to a halt has sometimes occurred.

Meanwhile, a driving apparatus including a pulse motor and a control means has been well known (refer to JP-A-6-164784). In such a driving apparatus, the pulse motor is coupled with driven loads via a power transmission mechanism, such as a gearwheel train, and the control means is configured to, before activating the pulse motor such that the pulse motor rotates in a normal direction, perform preliminary driving such that the pulse motor rotates in a reverse direction within a range of a backlash of the power transmission mechanism.

Heretofore, in existing products, when a paper jam has occurred during a paper transport, a method in which a user turns off a power supply of the product once, removes the jammed paper from a paper transport route, and then resumes the use of the product by turning on the power supply of the product has been employed.

Further, the driving apparatus disclosed in JP-A-6-164784 is intended to smoothly activate loads, such as a platen roller, by performing the preliminary driving in advance, but is not intended to remove the foregoing paper jam which occurs during a paper transport.

SUMMARY

An advantage of some aspects of the invention is that a paper transport device is provided, which includes a paper jam removing mechanism that makes it possible to reduce a user's burden in the removal of a paper jam to a greater degree as compared with in the case of existing paper transport devices.

According to an aspect of the invention, a paper transport device includes a motor; a transport portion that transports paper by using a power generated by the motor; a determination portion that, during a period when the paper is transported in a transport direction, determines whether or not a state in which a load larger than or equal to a predetermined load is applied to the motor has continued during a predetermined period; and a motor control portion that, when a result of the determination indicates that the state in which a load larger than or equal to the predetermined load is applied to the motor has continued during the predetermined period, causes the motor to rotate in a direction reverse to a normal rotation direction that is a direction in which the motor rotates in order to cause the paper to be transported in the transport direction, until an amount of the rotation of the motor in the direction reverse to the normal rotation direction reaches a predetermined rotation amount, and then causes the motor to rotate in the normal rotation direction again, in a state of causing an amount of electric current input to the motor to be larger than an amount of electric current that has been caused to be input to the motor in order to cause the paper to be transported in the transport direction before an occurrence of the state in which a load larger than or equal to the predetermined load is applied to the motor.

According to this configuration, when it is determined that the state in which a load larger than or equal to the predetermined load is applied to the motor has continued during the predetermined period, that is, when it is deemed that a paper jam has occurred, the motor is caused to rotate in the direction reverse to the normal rotation direction, and then the motor is caused to rotate in the normal rotation direction, in the state in which a larger amount of electric current is input to the motor (that is, retry processing is executed). Thus, it is possible to remove the paper jam and resume the paper transport without troubling a user.

In this case, when, after an execution of retry processing for causing the motor to rotate in the direction reverse to the normal rotation direction and then causing the motor to rotate in the normal rotation direction again, a result of the determination indicates again that the state in which a load larger than or equal to the predetermined load is applied to the motor has continued during the predetermined period, the motor control portion may execute the retry processing once again. Further, every time the retry processing is executed, the motor control portion may increase an amount of the electric current that is input to the motor in order to cause the motor to rotate in the normal rotation direction.

According to this configuration, the retry processing is repeatedly executed, and further, the magnitude of the effect of the retry processing is increased as the number of times of the executions of the retry processing increases. Thus, the paper jam is removed with further certainty.

In this case, the paper transport device may further include a read portion that performs reading processing for reading an image on the paper, and the transport portion may execute two kinds of transports, one being a transport during a period of the reading processing, the other one being a transport during a period other than the period of the reading processing. Further, the motor control portion may perform the retry processing, which is processing for causing the motor to rotate in the direction reverse to the normal rotation direction and then causing the motor to rotate in the normal rotation direction again, during the period other than the period of the reading processing.

According to this configuration, when a paper jam has occurred during the period other than the period of the reading processing, that is, when a paper jam has occurred during a period of feeding paper to the read portion or during a period of ejecting paper for which the reading processing has been completed, the paper jam is removed by executing the retry processing. In contrast, when a paper jam has occurred during the period of the reading processing, the retry processing is not executed. This is because, in the period of the reading processing, even though the paper jam is removed and the paper transport is resumed by executing the retry processing, the result of the reading processing has already failed, and thus, there is little merit in the execution of the retry processing.

In this case, a situation where the state in which a load larger than or equal to the predetermined load is applied to the motor has continued during the predetermined period may be made a situation where an amount of the load applied to the motor is smaller than an amount of a load that is applied to the motor in a situation where the transport portion becomes difficult to be driven.

According to this configuration, it is possible to remove the paper jam by executing the retry processing, before an amount of the load applied to the motor is increased as the difficulty of driving the transport portion increases, and finally becomes significantly large.

In this case, the paper transport device may further include a first gear train and a second gear train that intervene between the motor and the transport portion, the first gear train including a first gear that receives the power generated by the motor, the second gear train including a second gear to be engaged with the first gear train, and being configured to transmit the power to the transport portion via the second gear, and after releasing an engagement between the first gear train and the second gear train by causing the motor to rotate in the direction reverse to the normal rotation direction such that an amount of the rotation of the motor becomes larger than the predetermined rotation amount, the motor control portion may cause the first gear train and the second gear train to be engaged with each other by causing the motor to rotate in the normal rotation direction again.

According to this configuration, it is possible to increase a success rate of the retry because stresses and deformations that has arisen inside the gear trains because of the occurrence of the paper jam can be completely removed by releasing the engagement between the first gear train and the second gear train once.

In this case, the paper transport device may include a guide member extending in a movement direction in which the read portion moves, and a carriage unit including the read portion, the motor, the first gear train that is engaged with the guide member or the second gear train. Further, the motor control portion may cause the carriage unit to move in the movement direction by causing the motor to rotate in a first direction, in a state of causing the first gear train to be engaged with the guide member, and the motor control portion may cause the transport portion to transport the paper by causing the motor to rotate in a direction reverse to the first direction, in a state of causing the first gear train to be engaged with the second gear train.

According to this configuration, it is possible to appropriately remove a paper jam of paper that is transported, under an apparatus configuration that enables realization of two configuration modes, one being a configuration mode that allows an image on paper being in a stationary state to be read by moving the carriage unit (including the read portion), the other one being a configuration mode that allows an image on paper to be read by causing the transport portion to transport the paper relative to the read portion being in a stationary state.

The technical thought of the invention is realized as not only an invention of an object such as the above paper transport device, but also others. For example, processes realized by the constituent components of the above paper transport device can be deemed as an invention of a method for a paper transport device. Moreover, the technical thought of the invention may be realized as, for example, a computer program that causes a computer constituted by hardware components to execute such a method for a paper transport device; and a storage medium that stores such a computer program therein and is readable by a computer.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment according to the invention will be described with reference to the drawings.

Figure 1:
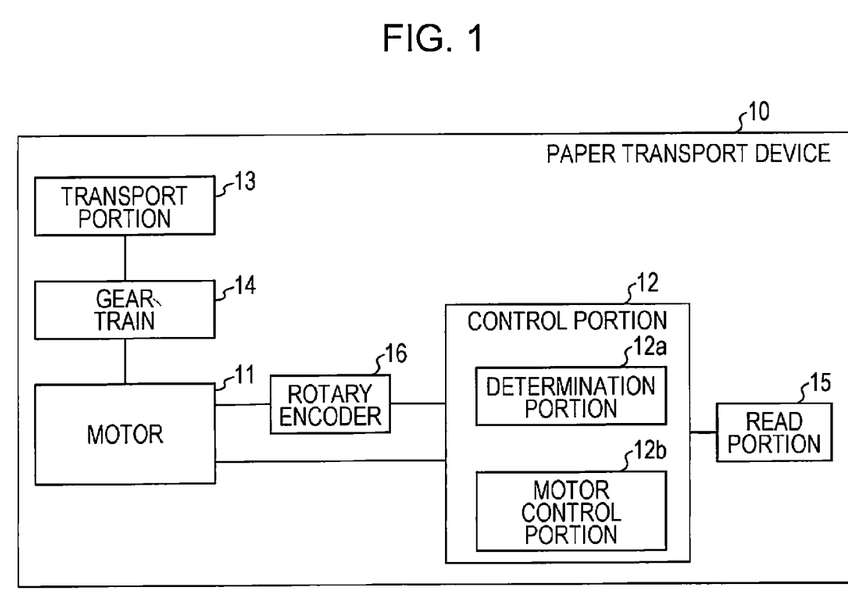
FIG. 1 is a schematic block diagram illustrating an example of the configuration of a paper transport device according to an embodiment of the invention.

FIG. 1 is a schematic block diagram illustrating an example of the configuration of a paper transport device 10. This paper transport device 10 includes at least a motor 11 that generates power, a transport portion 13 that transports paper by being driven by the power generated by the motor 11, and a control portion 12 that controls the motor 11 and the like. The transport portion 13 includes rollers for transporting the paper, and the like. The motor 11 is, for example, a DC motor. Further, a gear train 14, which is constituted by gears for transmitting the power to the transport portion 13, and the like, intervenes between the motor 11 and the transport portion 13.

The control portion 12 is constituted by an IC including, for example, a CPU, a ROM, and a RAM formed therein, and other electric components including a storage medium. The control portion 12 realizes various functional components, such as a determination portion 12a and a motor control portion 12b, by causing the CPU to execute arithmetic processing in accordance with programs stored in the ROM while using the RAM as a work area.

The motor control portion 12b performs feedback control so as to cause the number of rotations of the motor 11 (i.e., the speed of the motor 11) to become equal to a predetermined target speed, on the basis of detection signals that are output from a rotary encoder 16 and are input to the motor control portion 12b. The feedback control employed here is, for example, a proportional-integral-derivative (PID) control. In this case, the motor control portion 12b controls the speed of the motor 11 by performing pulse width modulation (PWM) on pulse signals supplied to the motor 11 and thereby adjusting an amount of electric current input to the motor 11. The rotary encoder 16 includes, for example, a scale plate that rotates together with the motor 11, and sensors each of which detects each of a plurality of slits that are formed at intervals of a constant pitch along the outer circumference of the scale plate. When the scale plate rotates together with the motor 11, each of the sensors outputs detection signals (pulse-shaped signals) each having a level that becomes a high level or a low level in accordance with whether or not the relevant sensor is in a state of detecting a slit. The frequency of the detection signals corresponds to the speed of the motor 11.

The paper transport device 10 may be configured to further include a read portion 15. The read portion 15 is a mechanism for optically reading an image on a document (paper targeted for reading) and generating image data, and includes a light source and imaging elements. The paper transport device 10 that is configured so as to include the read portion 15 can be called a scanner. When the paper transport device 10 is configured so as to transport paper, not to the read portion 15, but to a printing mechanism that performs recording using color materials, such as inks or toners, the paper transport device 10 including the printing mechanism can be called a printer. Alternatively, it is also possible to deem the paper transport device 10 as a multi-function printer including the read portion 15 and the printing mechanism.

Figure 2:
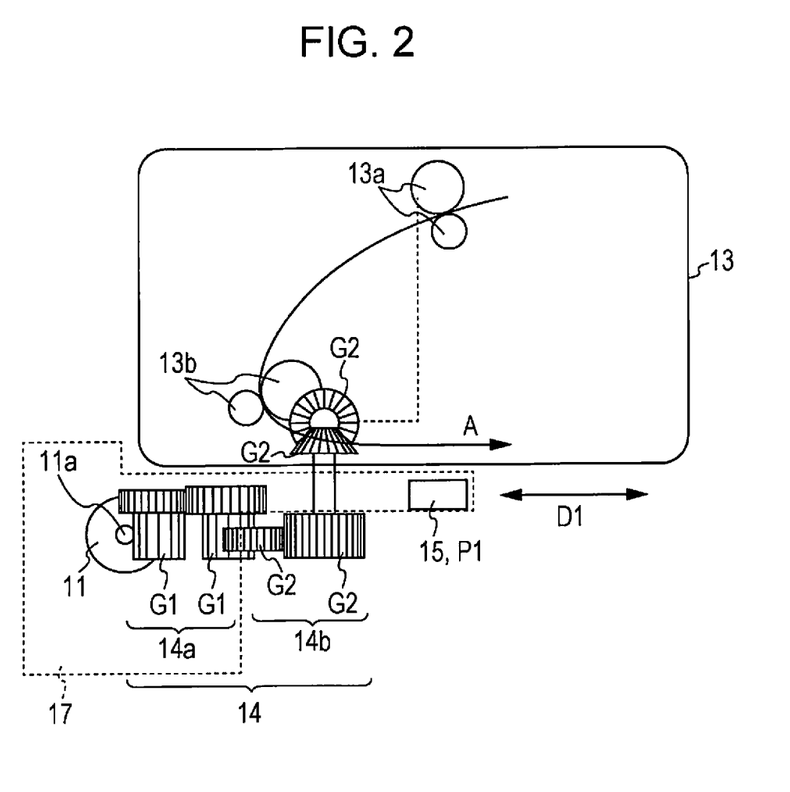
FIG. 2 is a side view illustrating an example of part of a paper transport device according to the embodiment of the invention.

FIG. 2 is a side view illustrating an example of part of the paper transport device 10. The transport portion 13 includes a pair of pick-up (PU) rollers 13a at an upstream side position on a transport rout for paper (refer to a curved line with an arrow A shown in FIG. 2), and a pair of paper feed (PF) rollers 13b at a more downstream side position than the position of the pair of PU rollers on the transport route. The paper is transported along the transport route by transmitting the power generated by the motor 11 to individual rollers including the pair of PU rollers 13a and the pair of PF rollers 13b and thereby causing these rollers to rotate in synchronization with one another. The direction of such a transport route extending from the upstream side toward the downstream side corresponds to "a transport direction". The transport route (the transport direction) may form a curved line shown in FIG. 2, or a straight line. The transport portion 13 includes a pair of ejection rollers for ejecting paper, at a more downstream side position than the position of the pair of PF rollers 13b on the transport route (here, the pair of ejection rollers being omitted from illustration).

When paper transported by the transport portion 13 passes above the read portion 15 that is placed in a stationary state at a predetermined position P1, an image on the paper is read by the read portion 15. Thus, the transport of a sheet of paper by the transport portion 13 is separated into three kinds of transports: a first one being a "paper feeding transport" that is a transport until the front edge of the sheet of paper reaches a position at which reading processing for reading an image on the sheet of paper is performed by the read portion 15; a second one being a "reading transport" that is performed during a period of the reading processing by the read portion 15; a third one being a "paper ejecting transport" that is performed for ejecting the sheet of paper, for which the reading processing has been completed, to the outside of the apparatus. The paper feeding transport and the paper ejecting transport corresponds to the foregoing transport during a period other than the period of the reading processing. Hereinafter, such processing for causing the transport portion 13 to transport paper and causing the read portion 15, which is in a state of being stationary at the position P1, to read an image on the paper will be referred to as first reading processing. The transport portion 13 is also called an auto document feeder (ADF).

As shown in FIG. 2, the gear train 14 includes a plurality of gears G1 and a plurality of gears G2, and the rotations of the individual gears constituting the gears G1 and the gears G2 are driven in conjunction with the rotation of a shaft 11a of the motor 11 and transmit the power generated by the motor 11 to the pair of PF rollers 13b, and thereby the pair of PF rollers 13b rotate. Although illustration is omitted, naturally, there exist gear trains each for transmitting the power generated by the motor 11 to a corresponding one of the pair of PU rollers 13a and the pair of ejection rollers. The gear train 14 is separated into two kinds of gear trains: one being a first gear train (a gear train 14a) including a first gear (at least one of the gears G1) that receives the power from the motor 11; the other one being a second gear train (a gear train 14b) that includes a second gear (at least one of the gears G2) engaged with the gear train 14a and that transmits the power to the transport portion 13 via the gears G2. The number and the configuration of the gears G1 constituting the gear train 14a as well as the number and the configuration of the gears G2 constituting the gear train 14b are not particularly limited. In this embodiment, a portion including the read portion 15, the motor 11, and the gear train 14a is referred to as a carriage unit 17. Although illustration is omitted in FIGS. 2 to 4, the carriage unit 17 may be configured so as to include the control portion 12 and the like.

Figure 3:
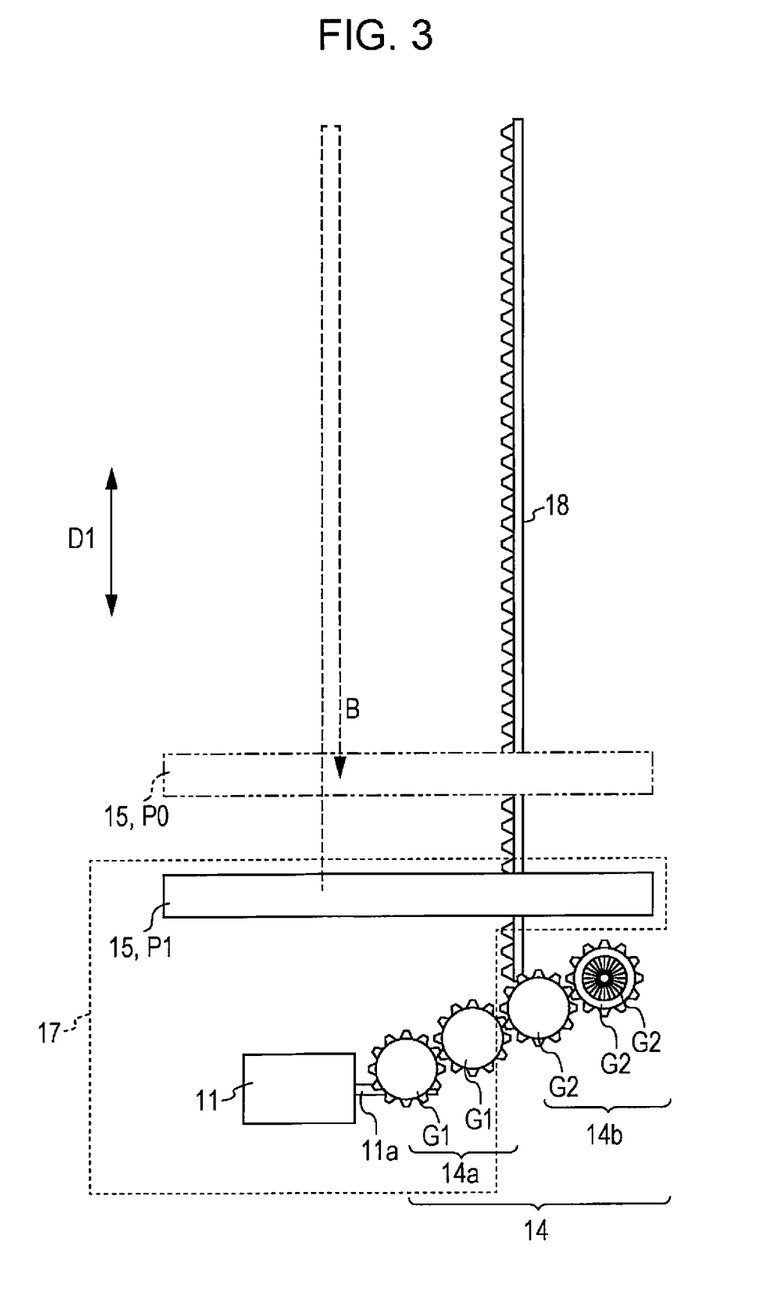
FIG. 3 is a top view illustrating an example of part of a paper transport device according to the embodiment of the invention, and a state in which gear trains 14a and 14b are engaged with each other.
Figure 4:
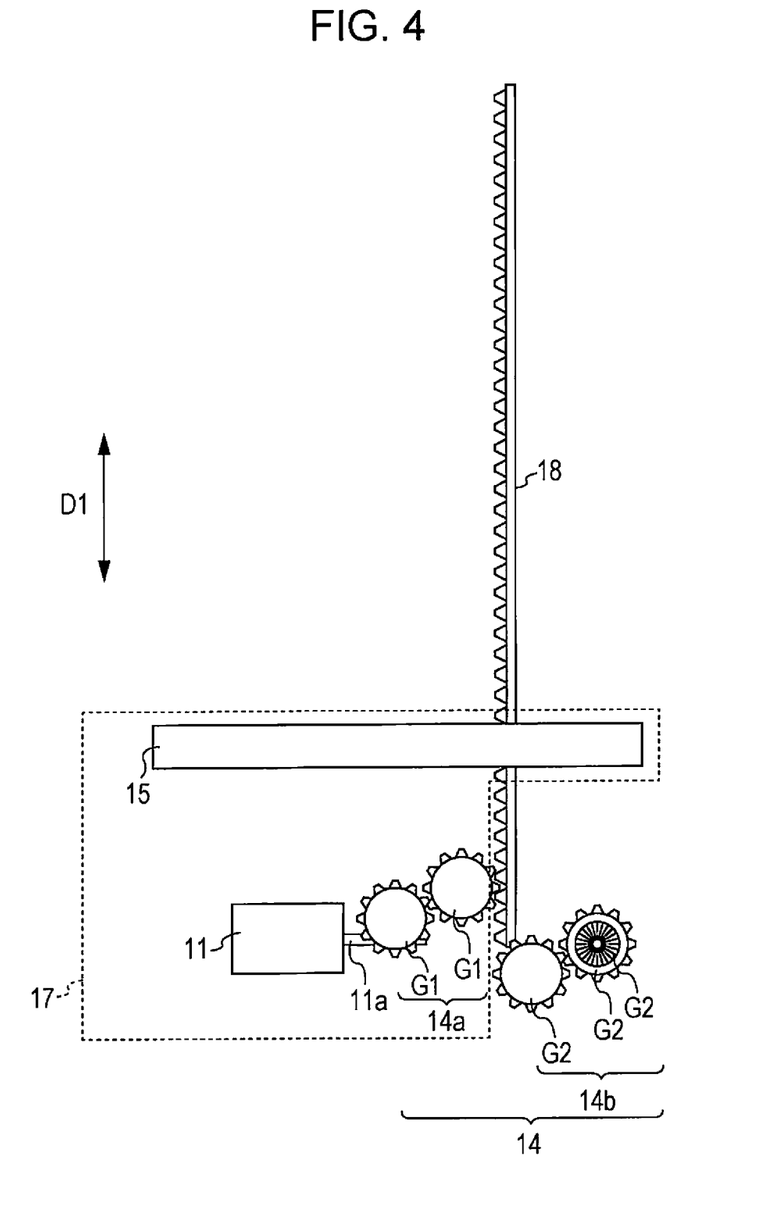
FIG. 4 is a top view illustrating an example of part of a paper transport device according to the embodiment of the invention, and a state in which the engagement between the gear trains 14a and 14b is released.

FIGS. 3 and 4 are top views each illustrating an example of part of the paper transport device 10. The carriage unit 17 is capable of reciprocating along a direction D1 by being guided by a guide member 18 (a rack gear) extending in the direction D1. The direction D1 is also referred to as a movement direction of the read portion 15. The carriage unit 17 is capable of causing the gear train 14a to be engaged with the guide member 18 or the gear train 14b.

The motor control portion 12b is capable of reciprocating the carriage unit 17 along the direction D1 by rotating the motor 11, in a state of having caused the gear train 14a to be engaged with the guide member 18 (FIG. 4) by controlling the rotation of the motor 11. For example, the motor control portion 12b is capable of moving the carriage unit 17 to a side in the direction D1, toward which the carriage unit 17 becomes further away from the gear train 14b, by causing the motor 11 to rotate in a first direction. The paper transport device 10 includes a document table (a platen glass), which is not illustrated. Hereinafter, processing for causing the read portion 15 of the carriage unit 17, which reciprocates along the direction D1 as described above, to perform scanning to read an image on a document that is placed on the platen glass and that is in a stationary state will be referred to as second reading processing. In the second reading processing, the engagement between the gear train 14a and the gear train 14b is released, and thus, each of the gear train 14b and the transport portion 13 is in a halt state.

Meanwhile, the motor control portion 12b is capable of, as described above, transmitting the power to the transport portion 13 and thereby causing the transport portion 13 to transport the paper by rotating the motor 11 in a direction reverse to the first direction in a state of having caused the gear train 14a to be engaged with the gear train 14b (FIG. 3) by controlling the rotation of the motor 11. Further, processing for causing the read portion 15 that is in a stationary state to read an image on paper that is in a state of been transported is the foregoing first reading processing. In the first reading processing, the engagement between the gear train 14a and the guide member 18 is released, and thus, the carriage unit 17 does not move (the read portion 15 is in a state of being stationary at the position P1).

That is, in the case where the paper transport device 10 is deemed as a product including the read portion 15, the paper transport device 10 is capable of reading an image on paper by using the first reading processing or the second reading processing, whichever is desired.

Figure 5:
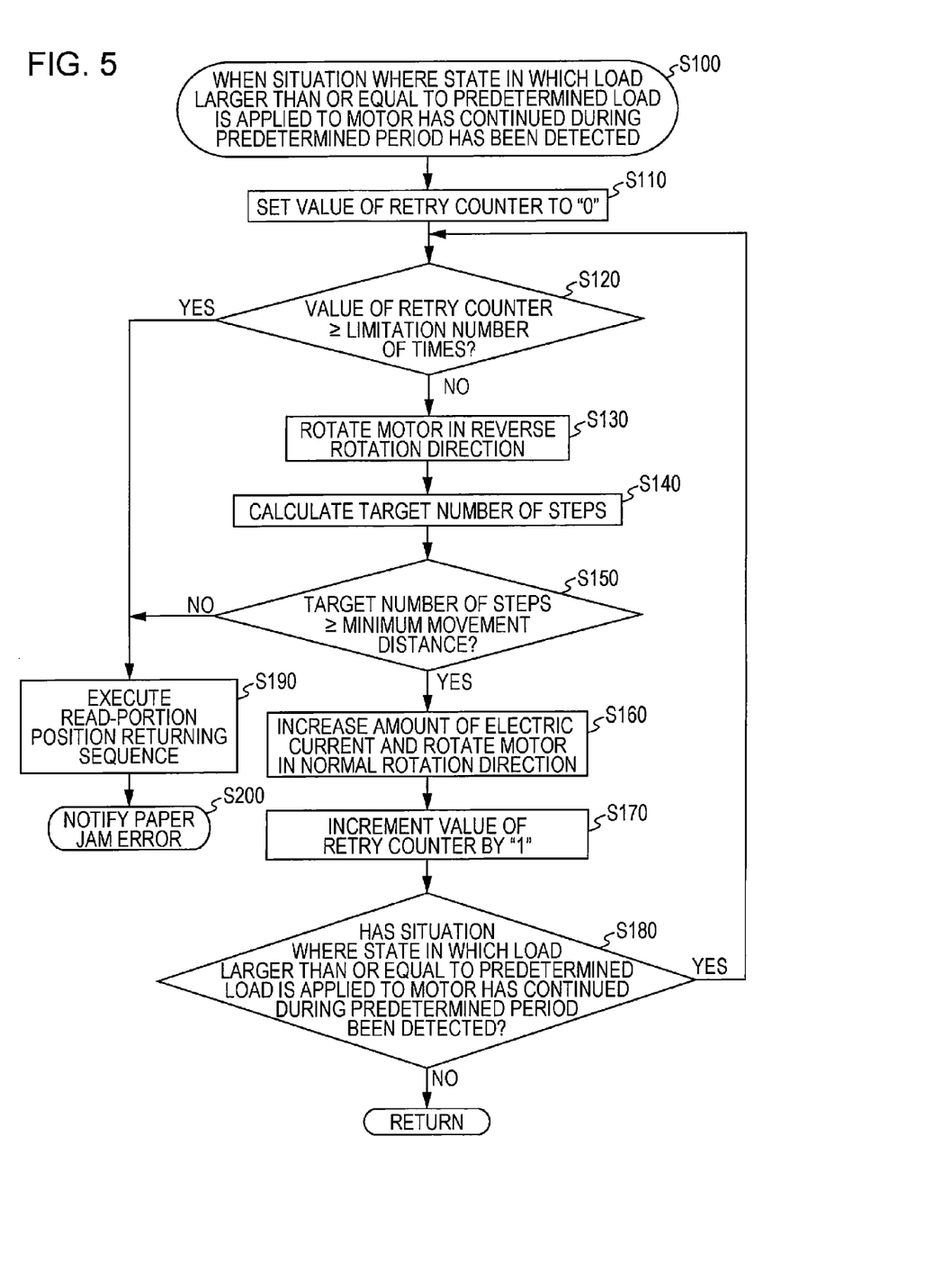
FIG. 5 is a flowchart illustrating an operation of the paper transport device according to the embodiment of the invention.

FIG. 5 is a flowchart illustrating paper transport processing performed by the paper transport device 10. Hereinafter, the flowchart will be described on the premise that the first reading processing has been started (that is, the paper feeding transport has been started). In the flowchart, the determination portion 12a determines whether or not a state in which a load larger than or equal to a predetermined load is applied to the motor 11 has continued during a predetermined period (step S100), and only when this state has been detected, processes in step S110 and subsequent steps are executed.

In step S100, the determination portion 12a repeatedly determines whether or not a duty ratio of a pulse signal supplied to the motor 11 reaches a predetermined upper limit value, at intervals of a timer interrupt period. This duty ratio means a ratio of duration of an on state (a high-level state) within one cycle of the pulse signal that is subjected to the pulse width modulation (PWM) described above. If a paper jam occurs during a paper transport, a resistance applied to the individual rollers of the transport portion 13 increases and a load applied to the motor 11 is also increased. Further, under the feedback control described above, this increase of the load leads to an increase of the duty ratio. Thus, the foregoing predetermined upper limit value with respect to the duty ratio of the pulse signal supplied to the motor 11 indirectly indicates the foregoing load larger than or equal to the predetermined load in the determination in step 100. The foregoing timer interrupt period is, for example, a time of around 200 microseconds. In the case where, in the determinations that are made at such intervals, the motor control portion 12b has continuously determined M times (for example, several thousands of times) that the duty ratio of the pulse signal supplied to the motor 11 has reached the foregoing predetermined upper limit value, the determination portion 12a deems that the state in which a load larger than or equal to the predetermined load is applied to the motor 11 has continued during the predetermined period (that is, the determination portion 12a deems that an error due to a paper jam has occurred), and causes the process flow to proceed to step S110 and then subsequent steps.

In step S110, the motor control portion 12b sets the value of a retry counter that indicates the number of execution completion times of the retry processing (corresponding to processes in steps S130 to S160) to "0" (that is, the motor control portion 12b performs the initialization of the value of the retry counter). The retry processing in steps S130 to S160 will be described below.

In step S120, the motor control portion 12b determines whether or not a current value of the retry counter is larger than or equal to a predetermined limit number of times of executions of the retry processing. The limit number of times is already set in a product (the paper transport device 10) when the product is shipped to markets by a manufacturer thereof. Further, the limit number of times may be set, for each the reading transport and a set of transports other than the reading transport (i.e., a set of the paper feeding transport and the paper ejecting transport), to a corresponding one of mutually different values. In the following description, a limit number of times of executions of the retry processing associated with the reading transport will be represented by a limit number of times TH1, and a limit number of times of executions of the retry processing associated with the set of transports other than the reading transport (i.e., the set of the paper feeding transport and the paper ejecting transport) will be represented by a limit number of times TH2. In this embodiment, the limit number of times TH1 is made equal to "0", and the limit number of times TH2 is made equal to a natural number larger than or equal to "1". This means that any retry processing is not performed during a period of the reading processing by the read portion 15 for reading an image on paper, but the retry processing is performed during a period other than the period of the reading processing.

Before making such a determination in step S120, the motor control portion 12b determines which of the reading transport and the set of transports other than the reading transport a currently executed transport is. The determination as to which of the reading transport and the set of transports other than the reading transport the currently executed transport is can be determined by determining within which of a predetermined range of the reading transport and a range outside the range of the reading transport a current transport position exists. For example, the motor control portion 12b deems, as the "current transport position", a distance of the transport by the transport portion 13 during a period from a time point when the paper feeding transport begins until a time point when, in step S100, a first one of the M times of continuous determinations each indicating the reach of the duty ratio to the upper limit value has been made. The transport distance can be calculated by using, for example, an accumulated number of pulses (encoder pulses, each being abbreviated to "EP" below) which constitute the detection signals output from the rotary encoder 16. When a current transport of paper is the reading transport, the motor control portion 12b compares a current value of the retry counter with the limit number of times TH1. Further, in the case where a formula: "Value of retry counter≥Limit number of times TH1" is satisfied, the motor control portion 12b causes the process flow to proceed to step S190 without performing the retry processing. Further, when the current transport of paper is any one of the transports other than the reading transport, the motor control portion 12b compares the current value of the retry counter with the limit number of times TH2. Further, in the case where a formula: "Value of retry counter≥Limit number of times TH2" is satisfied, the motor control portion 12b causes the process flow to proceed to step S190 without performing the retry processing; while, in the case where a formula: "Value of retry counter<Limit number of times TH2" is satisfied, the motor control portion 12b causes the process flow to proceed to step S130, where the retry processing starts.

In step S190, the motor control portion 12b executes a read-portion position returning sequence. The read-portion position returning sequence is processing for returning the position of the read portion 15 from the position P1 as of then to a predetermined initial position P0 (refer to FIG. 3). The initial position P0 is also a start position of the read portion 15 in the second reading processing. In FIG. 3, an example of a route on which the read portion 15 moves along the direction D1 in the read-portion position returning sequence is illustrated by using a dashed line with an arrow B. The motor control portion 12b controls the rotation of the motor 11 so as to cause the motor 11 to rotate in a direction that causes the gear train 14a to be separated from the gear train 14b and further be engaged with the guide member 18, and then controls the rotation of the motor 11 so as to cause the carriage unit 17 to make the movement along the relevant route. Such an execution of the read-portion position returning sequence removes stresses and deformations having occurred in the individual rollers of the transport portion 13, the gear train 14b, and the like, because of the occurrence of the paper jam, and thereby makes it easy to remove the jammed paper from the transport portion 13.

In step S200, the motor control portion 12b performs settings of the PWM control on the motor 11 as follows: decay of electric current: fast decay, voltage: 0 volt, and duty ratio: 0, and then notifies the occurrence of a paper jam error to the outside. This notification is made by, for example, displaying a message for notifying the occurrence of the paper jam error on a predetermined display portion (a liquid crystal display panel or the like). This display portion may be a display portion included in the paper transport device 10, or a monitor included in an external computer or the like that is communicably connected to the paper transport device 10. Upon recognition of the notification, a user removes paper that is jammed inside the transport portion 13. In this case, the user does not need to follow a conventional method in which it is required to turn off a power supply of the paper transport device 10 once before removing the jammed paper. The user can remove the jammed paper in a state of keeping the power supply of the paper transport device 10 to a turned-on state. Thus, an amount of user's operations required to resume the paper feeding transport is smaller than that in the conventional method.

Further, in step S130, the motor control portion 12*b* causes the motor 11 to rotate in a direction reverse to a rotation direction (a normal rotation direction) that causes paper to be transported in the transport direction, until an amount of the rotation of the motor 11 reaches a predetermined rotation amount. Hereinafter, the direction reverse to the normal rotation direction will be referred to as a reverse rotation direction. Here, the predetermined rotation amount means a rotation amount of a degree that allows a backlash to be ensured between every two engaged ones of the gears constituting the gear train 14, and that corresponds to a distance of, for example, around 0.1 inches. That is, the occurrence of the paper jam causes a situation in which the tooth of every two engaged ones of the gears are in so close contact with each other that there exists no backlash, the backlash being a slight space to be essentially ensured between the tooth of the every two engaged ones of the gears, and thus, in step S130, in order to ensure the backlash between the tooth of the every two engaged ones of the gears, the motor 11 is caused to slightly rotate in the reverse rotation direction. In addition, the predetermined amount of rotation of the motor 11 in the reverse rotation direction in step S130 is a rotation that merely allows the backlashes to be ensured in the gear train 14 in a state in which the engagement between the gear trains 14*a* and 14*b* is kept, and thus, the individual rollers of the transport portion 13 do not move and thus the paper does not move.

In step S140, the motor control portion 12*b* calculates the number of steps (a target number of steps) corresponding to required normal-rotation direction rotations of the motor 11 subsequent to the above slight reverse-rotation direction rotation of the motor 11. The number of steps here means the number of the EPs (i.e., the number of the encoder pulses). As an example, it is assumed that, in the case where a paper jam has occurred during a paper feeding transport, the number of all steps required to complete the paper feeding transport: 1000 EPs, the number of steps at a time point when the paper jam has occurred: 700 EPs, and the number of steps corresponding to the reverse-rotation direction rotation in step S130: 100 EPs. A distance indicated by one EP is determined in advance in accordance with the foregoing constant pitch of the slits of the scale plate, and thus, each of the numbers of steps means a distance. Further, the number of steps at a time point when the paper jam has occurred indicates a distance from a start position of the paper feeding transport up to the "current transport position".

In the above example, the motor control portion 12*b* can calculate the target number of steps by using an expression: "(The number of all steps required to complete paper feeding transport)−(The number of steps at a time point when a paper jam has occurred)+(The number of steps corresponding to reverse-rotation direction rotation in step S130)", and the result of this calculation becomes as follows: the target number of steps=400 EPs.

In step S150, the motor control portion 12*b* determines whether or not a formula: "Target number of steps ≥Minimum movement distance" is satisfied. This minimum movement distance corresponds to the number of steps that are required at a minimum in acceleration and de-acceleration of the motor 11, which are required to transport paper on the basis of a target speed of the PID control. In the case where the formula: "Target number of steps≥Minimum movement distance" is not satisfied, actually, a transport operation in accordance with the target number of steps is difficult to be performed, and thus, the process flow is caused to proceed to step S190. In contrast, in the case where the formula: "Target number of steps≥Minimum movement distance" is satisfied, the process flow is caused to proceed to step S160.

In step S160, under the PID control in accordance with the target speed thereof, the motor control portion 12*b* controls the motor 11 so as to cause the motor 11 to rotate in the normal rotation direction by a rotation amount corresponding to the target number of steps. In this regard, in step S160, the motor control portion 12*b* causes the motor 11 to rotate in the normal rotation direction in a state of causing an amount of electric current input to the motor 11 to be increased such that the increased amount of electric current is larger than an amount of electric current that, before the occurrence of the state in which a load larger than or equal to the predetermined load is applied to the motor 11, has been input to the motor 11 for the purpose of the transport in the transport direction. In addition, the amount of electric current that, before the occurrence of the state in which a load larger than or equal to the predetermined load is applied to the motor 11, has been input to the motor 11 for the purpose of the transport in the transport direction, means an amount of electric current that has been supplied to the motor 11 to achieve the target speed under the PID control before the paper feeding transport reaches the foregoing "current transport position". The amount of electric current input to the motor 11 is controlled by adjusting the duty ratio in the PWM.

In step S170, the motor control portion 12*b* increments the current value of the retry counter by "1".

In step S180, the determination portion 12*a* determines whether or not the state in which a load larger than or equal to the predetermined load is applied to the motor 11 has continued during the predetermined period, and in the case where it is determined that the state in which a load larger than or equal to the predetermined load is applied to the motor 11 has continued during the predetermined period, the process flow is caused to return to step S120. That is, in step S180, the same determination as that in step S100 is made after the execution of the retry processing (i.e., the processes in steps S130 to S160) for causing the motor 11 to rotate in the reverse rotation direction and then rotate in the normal rotation direction again. If the limitation number of times referred to in step S120 is larger than or equal to two or more, the retry processing is executed a plurality of times. In contrast, in step S180, in the case where the determination portion 12*a* does not determine that the state in which a load larger than or equal to the predetermined load is applied to the motor 11 has continued during the predetermined period, this means that a normal transport of the paper in the transport direction has resumed after an immediately previous execution of the retry processing.

Figure 6:
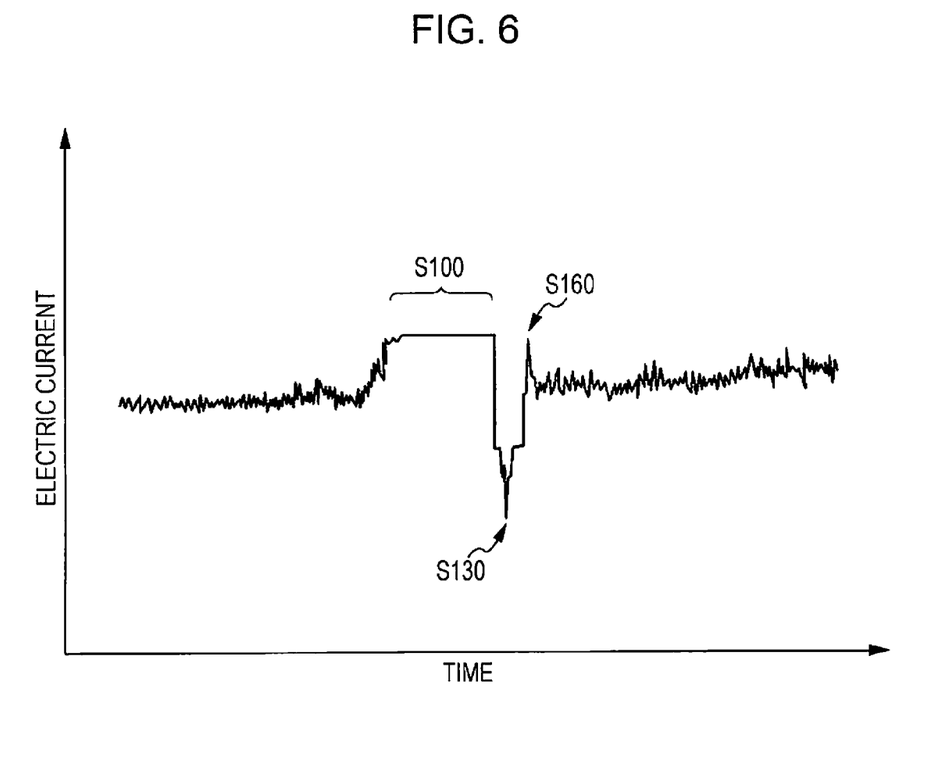
FIG. 6 is a diagram illustrating electric current variation according to the embodiment of the invention.

FIG. 6 is a diagram illustrating a variation of an amount of electric current that is supplied to the motor 11 in accordance with the above flowchart during a paper feeding transport. As shown in FIG. 6, the amount of electric current suddenly increases in a state of being kept to an approximately constant amount, and then is kept to the increased amount of electric current for a while. This increased amount of electric current corresponds to the foregoing upper limit value of the duty ratio and when such a high value has been continuously detected M times in step S100, it is deemed that an error due to a paper jam has occurred, and the processes in step S110 and subsequent steps are performed. In the processes in step S110 and subsequent steps, as control of the motor 11, the reverse-direction rotation is executed (step S130), and then the normal-direction rotations corresponding to the target steps are executed in a state in which the amount of electric current supplied to the motor 11 is temporarily increased (step S160). After the process in step S160, the amount of electric current supplied to the motor 11 is substantially the same as that of electric current having been supplied thereto before the occurrence of the paper jam and is stable again, and thus, it can be understood that the paper jam has been removed by the retry processing in steps S130 to S160 and the transport in the transport direction is resumed.

As described above, according to this embodiment, the paper transport device 10 is configured to, when having determined that a paper jam has occurred, ensure the backlashes by causing the motor 11 to slightly rotate in the reverse rotation direction, and then cause the motor 11 to rotate in the normal rotation direction in a state in which a larger amount of electric current is supplied to the motor 11 (that is, upon determination of the occurrence of a paper jam, the paper transport device 10 performs the retry processing). That is, since an excessive locked state between every two engaged ones of the gears constituting the gear train 14 is released (step S130) and then the motor 11 is caused to rotate in the normal rotation direction in a state in which the torque of the motor 11 is temporarily increased (step S160), the paper jam having occurred is removed with certainty, thereby enabling significant reduction of scenes where a user itself removes the jammed paper from the transport portion 13. As described above, in this embodiment, the retry processing is not performed during an execution of the reading processing. This is because when a paper jam has occurred during an execution of the reading processing, the result of the reading processing performed by the read portion 15 has already failed at that time, and thus, any execution of the retry processing to resume the reading transport of paper is meaningless.

The situation that is a detection target in each of steps S100 and S180 and that indicates that the state in which a load larger than or equal to the predetermined load is applied to the motor 11 has continued during the predetermined period is a situation in which an amount of the load applied to the motor 11 is smaller than an amount of a load that is applied to the motor 11 in a state in which the transport portion 13 becomes difficult to be driven. Specifically, in the determinations each of which relates to whether or not a state in which the duty ratio of the pulse signal supplied to the motor 11 reaches the foregoing predetermined upper limit value has occurred, and which are repeatedly made at intervals of the foregoing time interrupt period, when the state has continuously occurred N times, every two engaged ones of the gears constituting the gear train 14 are in a state of being firmly locked with each other and thereby the transport portion 13 becomes significantly difficult to be driven. In this embodiment, the value of the foregoing M times, which is used in the detection in each of steps S100 and S180, is set to a value smaller than the value of the forgoing N times. Thus, in this embodiment, it is possible to activate the retry processing before the occurrence of such a situation where the transport portion 13 is significantly difficult to be driven and a significantly large load is applied to the motor 11, thereby making it possible to prevent the paper transport device 10 from falling into a situation where a fatal error occurs therein. This fatal error means an error that causes a user to turn off a power supply of the paper transport device 10 once, remove the cause of the error (i.e., the jammed paper), and turn on the power supply.

As described above, in the case where the limit number of times that is referred to in step S120 is larger than or equal to two, the retry processing is performed a plurality of times. In this case, the amount of the electric current that is input to the motor 11 in order to cause the motor 11 to rotate in the normal rotation direction in step S160 may be increased as the number of times of the repeated executions of the retry processing increases. That is, when the process flow proceeds to step S160 via "Yes" in the determination of step S180 and "No" in the determination of step S120 and the process in step S160 is executed, the torque of the motor 11 is caused to be further increased by supplying the motor 11 with a larger amount of electric current than an amount of electric current having been supplied thereto in an immediately previous execution of the process in step S160. This configuration makes it possible to further increase the possibility that the paper jam is removed by repeatedly performing the retry processing.

The invention is not limited to the above embodiment, but can be practiced as various embodiments within the scope not departing from the gist of the invention and, for example, embodiments described below can be employed. Configurations resulting from appropriately combining individual embodiments are also included in the scope of the disclosure of the invention. In the description of the following embodiments, items common to those of the aforementioned embodiment will be appropriately omitted from description.

In the procedure of the retry processing, the motor control portion 12b may release the engagement between the gear train 14a and the gear train 14b by causing the motor 11 to rotate in the reverse rotation direction (the foregoing first direction) until an amount of the rotation of the motor 11 reaches a rotation amount larger than the foregoing predetermined rotation amount, and then may cause the motor 11 to rotate in the normal rotation direction again to cause the gear train 14a and the gear train 14b to be engaged with each other. Specifically, in step S130, the motor control portion 12b causes the motor 11 to rotate in the reverse rotation direction until an amount of the rotation of the motor 11 reaches a rotation amount that is larger than the foregoing predetermined rotation amount, that is, the foregoing rotation amount of a degree that allows the backlash to be ensured between every two engaged ones of the gears constituting the gear train 14. This configuration causes the gear train 14a and the gear train 14b to transit from a state in which the gear train 14a is engaged with the gear train 14b, an example of this state being illustrated in FIG. 3, to a state in which the gear train 14a is completely separated from the gear train 14b, an example of this state being illustrated in FIG. 4.

Further, in the calculation of the target number of steps in next step S140, the motor control portion 12b takes into consideration an additional number of steps (which is, for example, several hundreds of EPs) corresponding to the reverse-rotation direction rotation that is made by the motor 11 in order to further release the engagement between the gear train 14a and the gear train 14b in the state in which the backlashes are already ensured in the gear train 14a and the gear train 14b. That is, in the expression for obtaining the target number of steps: "(The number of all steps required to complete paper feeding transport)−(The number of steps at a time point when a paper jam has occurred)+(The number of steps corresponding to reverse-rotation direction rotation in step S130)", the third term in the above expression, that is, "the number of steps corresponding to the reverse-rotation direction rotation in step S130" is replaced by a value resulting from adding the above additional number of steps to the number of steps that is required to ensure the backlashes and that has been described in the above embodiment.

Through a process of, in step S160, causing the motor 11 to rotate in the normal-rotation direction until an amount of this normal-rotation direction rotations reaches a target number of steps that is calculated in such a way as described above, it is possible to return to the state again in which the gear train 14a and the gear train 14b are engaged with each other, an example of this state being illustrated in FIG. 3, and further, resume the transport of paper in a state in which the paper jam is removed. This configuration, in which the engagement between the gear train 14a and the gear train 14b is released once upon occurrence of a paper jam, makes it possible to completely remove stresses and deformations having arisen inside the gear train 14 because of the occurrence of the paper jam, and thus, enables increase of a success rate of the retry.

The entire discovery of Japanese Patent Application No. 2014-173949, filed Aug. 28, 2014 is expressly incorporated by reference herein.

What is claimed is:

1. A paper transport device comprising:
    a motor;
    a transport portion that transports paper by using a power generated by the motor;
    a determination portion that, during a period when the paper is transported in a transport direction, determines whether or not a state in which a load larger than or equal to a predetermined load is applied to the motor has continued during a predetermined period; and
    a motor control portion that, when a result of the determination indicates that the state in which a load larger than or equal to the predetermined load is applied to the motor has continued during the predetermined period, causes the motor to rotate in a direction reverse to a normal rotation direction that is a direction in which the motor rotates in order to cause the paper to be transported in the transport direction, until an amount of the rotation of the motor in the direction reverse to the normal rotation direction reaches a predetermined rotation amount, and then causes the motor to rotate in the normal rotation direction again, in a state of causing an amount of electric current input to the motor to be larger than an amount of electric current that has been caused to be input to the motor in order to cause the paper to be transported in the transport direction before an occurrence of the state in which a load larger than or equal to the predetermined load is applied to the motor.

2. The paper transport device according to claim 1,
    wherein, when, after an execution of retry processing for causing the motor to rotate in the direction reverse to the normal rotation direction and then causing the motor to rotate in the normal rotation direction again, a result of the determination indicates again the occurrence of the state in which a load larger than or equal to the predetermined load is continuously applied to the motor during the predetermined period, the motor control portion executes the retry processing once again, and
    wherein, every time the retry processing is executed, the motor control portion increases an amount of the electric current that is input to the motor in order to cause the motor to rotate in the normal rotation direction.

3. The paper transport device according to claim 2 further comprising a read portion that performs reading processing for reading an image on the paper,
    wherein the transport portion executes two kinds of transports, one being a transport during a period of the reading processing, the other one being a transport during a period other than the period of the reading processing, and
    wherein the motor control portion performs the retry processing, which is processing for causing the motor to rotate in the direction reverse to the normal rotation direction and then causing the motor to rotate in the normal rotation direction again, during the period other than the period of the reading processing.

4. The paper transport device according to claim 3, wherein a situation where the state in which a load larger than or equal to the predetermined load is applied to the motor has continued during the predetermined period is a situation where an amount of the load applied to the motor is smaller than an amount of a load that is applied to the motor in a situation where the transport portion becomes difficult to be driven.

5. The paper transport device according to claim 4 further comprising a first gear train and a second gear train that intervene between the motor and the transport portion, the first gear train including a first gear that receives the power generated by the motor, the second gear train including a second gear to be engaged with the first gear train, and being configured to transmit the power to the transport portion via the second gear, and
    wherein, after releasing an engagement between the first gear train and the second gear train by causing the motor to rotate in the direction reverse to the normal rotation direction such that an amount of the rotation of the motor becomes larger than the predetermined rotation amount, the motor control portion causes the first gear train and the second gear train to be engaged with each other by causing the motor to rotate in the normal rotation direction again.

6. The paper transport device according to claim 5 further comprising a guide member extending in a movement direction in which the read portion moves, and a carriage unit including the read portion, the motor, the first gear train that is engaged with the guide member or the second gear train, and
    wherein the motor control portion causes the carriage unit to move in the movement direction by causing the motor to rotate in a first direction, in a state of causing the first gear train to be engaged with the guide member, and
    wherein the motor control portion causes the transport portion to transport the paper by causing the motor to rotate in a direction reverse to the first direction, in a state of causing the first gear train to be engaged with the second gear train.

* * * * *